United States Patent [19]

Narayana et al.

[11] 3,860,551

[45] Jan. 14, 1975

[54] METHOD OF MAKING STABLE EMULSIONS OF IMMISCIBLE SOLUTIONS OF THERMOPLASTIC POLYMERS AND ETHYLENICALLY UNSATURATED MONOMERS

[75] Inventors: Munisamappa Narayana; Henno Keskkula; Jerry E. Mason, all of Hemlock, Mich.

[73] Assignee: The Dow Chemical Company, Midland, Mich.

[22] Filed: Oct. 2, 1972

[21] Appl. No.: 293,785

Related U.S. Application Data

[63] Continuation of Ser. No. 115,687, Feb. 16, 1971, abandoned, which is a continuation-in-part of Ser. No. 840,502, July 9, 1969, abandoned.

[52] U.S. Cl............... 260/33.6 A, 260/33.6 PQ, 260/33.6 R, 260/34.2, 260/880, 260/892
[51] Int. Cl. ............................................. C08f 45/28
[58] Field of Search......... 260/34.2, 33.6 R, 33.6 A, 260/33.6 PQ, 880 R, 892

[56] References Cited
UNITED STATES PATENTS

| 2,623,863 | 12/1952 | Dieckmann et al................ 260/892 |
| 2,694,692 | 11/1954 | Amos et al...................... 260/880 R |
| 2,886,553 | 5/1959 | Stein et al..................... 260/880 R |
| 3,226,453 | 12/1965 | Arnold et al................... 260/33.6 A |
| 3,317,635 | 5/1967 | Osmond........................... 260/34.2 |
| 3,532,663 | 10/1970 | Nicks et al...................... 260/34.2 |

*Primary Examiner*—Lewis T. Jacobs
*Attorney, Agent, or Firm*—Robert B. Ingraham

[57] ABSTRACT

The disclosure concerns a method of making stable emulsions of mixtures of two immiscible solutions of thermoplastic polymers dissolved in a solvent, or in ethylenically unsaturated monomers polymerizable by heat and/or radical initiators to form normally solid polymers.

9 Claims, No Drawings

METHOD OF MAKING STABLE EMULSIONS OF IMMISCIBLE SOLUTIONS OF THERMOPLASTIC POLYMERS AND ETHYLENICALLY UNSATURATED MONOMERS

This application is a continuing application of our co-pending application Ser. No. 115,687, filed Feb. 16, 1971, now abandoned, which in turn is a continuation-in-part of our earlier filed application Ser. No. 840,502, filed July 9, 1969, now abandoned.

This invention concerns a method of making stable emulsions of immiscible solutions of thermoplastic polymers dissolved in an ethylenically unsaturated monomer or in another solvent and relates to a method of making toughened thermoplastic polymers.

It is known to make toughened or high impact styrene polymer by uniformly and intimately incorporating with polystyrene a small amount of natural or a synthetic rubber, either by mechanically blending a resinous styrene polymer with the rubber at elevated temperatures, or by dissolving the rubber in monomeric styrene and heating the solution at elevated temperatures to polymerize the monomer and form a normally solid thermoplastic resinous product. Methods of making toughened or high impact styrene polymers are described in U.S. Pat. Nos. 1,613,673; 2,616,864; 2,623,863; 2,862,906; 2,886,553 and 2,694,692. The high impact polymers are useful for various purposes, and are particularly useful in making molded articles, or shaped articles from extruded sheet; e.g., by vacuum forming, such as cups, containers, refrigerator liners or refrigerator door liners and the like.

In making toughened polymers by dissolving an elastomer or synthetic rubber in an ethylenically unsaturated monomer capable of addition polymerization and heating the solution at elevated temperatures to polymerize the monomers and form a normally solid thermoplastic polymer, the occurrence of phase separation as indicated by opacity of the system is often observed. We have found that during this process of polymerization, a significant change occurs in the character of the polymerizing solution, usually in the range of from about 5 to about 30 percent by weight of the monomer being polymerized. We have observed that the solution; that is initially a one phase solution of the elastomer as the only solute dissolved in the monomer, changes to a two phase system as monomer is polymerized, thereby forming a polymer as the second solute. Our microscopical investigations revealed that this two phase system is, at first, a dispersion of droplets of the polymer solution in a continuous phase of the elastomer solution, and that a phase inversion occurs after which the system is a dispersion of droplets of the elastomer solution in a continuous phase of the polymer solution. We consider such a polymerizing system as an oil-in-oil emulsion and compare the occurring phase inversion to the phase inversion reported to occur under certain conditions in oil-water emulsions. On further polymerization, the oil-in-oil emulsions solidify to form the final polymer, in which the elastomer is dispersed in the form of fine particles. The size of these particles, which is significant for the properties of the final polymer, is established by the observed phase inversion.

If a minor proportion of a polymer is dissolved in a monomer capable of addition polymerization, together with a major proportion of polymer of said monomer, the resulting system separates into two phases, namely into two immiscible solutions of the first polymer and the second polymer. These phases can be dispersed in each other by rapid agitation, but the resulting dispersion is unstable and separates readily into two liquid layers upon standing. No satisfactory dispersion of polymers in the final product can be achieved when such an unstable dispersion is solidified by polymerization of the monomer therein.

We have now discovered that stable emulsions of immiscible solutions, which are obtained by dissolving a minor proportion of a thermoplastic polymer in an inert solvent; e.g., toluene, or in a monomer as solvent, and a major proportion of a different polymer which is soluble in the inert solvent or the monomer, can readily be prepared by incorporating into the mixture of the polymer solutions as a stabilizing agent a small but effective proportion, within the range of from 0.5 to 5 percent, or more, of the weight of the mixture of said solutions, of a block copolymer as more fully hereinafter described. In other words, it has been found that stable emulsions of two different polymers in a mutual or common solvent can be prepared by using a block copolymer in which only one of the blocks needs to be identical with the polymer of the continuous phase.

It has further been found that the stabilized emulsions of immiscible solutions of the polymers and the monomer can be heated without further agitation and without breaking of the emulsions at elevated temperatures; e.g., at temperatures between 60° C. and 260° C., in admixture with, or without, polymerization initiators, and the monomer polymerized in usual ways such as in mass, or in aqueous suspension, to produce normally solid resinous thermoplastic products.

The invention provides a way of intimately incorporating non-compatible polymers with one another. The dispersions or emulsions can be heated, with or without catalysts to form novel polymeric products, which are useful for a variety of purposes in the home and industry; e.g., for extruding as a sheet and vacuum forming into cups or containers.

The monomers to be employed as solvent for the polymers can be any vinylidene aromatic hydrocarbon or nuclear halogenated vinylidene aromatic hydrocarbon polymerizable by addition to form normally solid thermoplastic polymers. Among suitable monomers are styrene, vinyltoluene, vinylxylene, ethylvinylbenzene, isopropylstyrene, tert-butylstyrene, chlorostyrene, dichlorostyrene, bromostyrene, fluorostyrene or mixtures of any two or more of such unsaturated aromatic compounds, or mixtures of any one or more of said compounds and methyl methacrylate.

The polymer to be dissolved in the monomer in major proportion; i.e., the continuous phase polymer as contrasted to the different polymer dissolved in the monomer in minor proportion (the discontinuous phase polymer), can be any of a variety of polymers but must be compatible with the polymer of the monomer(s). A simple test to determine the compatibility of the polymers is to dissolve 5 weight percent of each polymer in the monomer(s). A clear transparent solution which does not readily separate into two or more layers on standing indicates that the polymers are compatible.

The different polymer to be dissolved in the monomer in minor proportion; i.e., the discontinuous phase, can be any resinous or rubbery thermoplastic homopolymer or copolymer of methyl methacrylate, monovinyl aromatic hydrocarbon, butadiene or butene. Suitable polymers are homopolymer of methyl methacrylate, polystyrene, polyvinyltoluene, poly(tert-butylstyrene), copolymers of from about 65 weight percent to 85 weight percent of styrene and correspondingly from about 35 to 15 weight percent acrylonitrile, copolymers of styrene and methyl methacrylate, polybutadiene, copolymers of styrene and butadiene, polyisoprene, ethylenepropylene copolymers and polybutene rubbers. Such polymers are employed in amounts corresponding to from 5 to 40 parts by weight per 100 parts by weight of the continuous phase polymer initially used.

The stabilizing block copolymer to be employed as the emulsifier can be a block copolymer of a vinyl aromatic compound; e.g., styrene, vinyltoluene, vinylxylene or tert-butylstyrene and butadiene. The block copolymers can be of the type AB containing 50 percent by weight or more of the vinyl aromatic compound or of the type ABA containing 20 to 30 percent vinyl aromatic compound wherein A represents vinyl aromatic compound, B represents butadiene and which block copolymers have an inherent viscosity between 1.3 and 3.7. The stabilizing block copolymer can be used in amounts of from 0.5 to 5 percent by weight or more of the mixture of materials.

In general, the block copolymers of the AB type are prepared by first polymerizing a conjugated diolefin such as butadiene-1,3, isoprene or dimethylbutadiene-1,3 in an aliphatic or an aromatic hydrocarbon solvent using a lithium-hydrocarbon compound catalyst, then introducing the vinyl aromatic compound into the mixture and polymerizing it, or by polymerizing a mixture of the conjugated diolefin and the vinyl aromatic compound in an inert hydrocarbon solvent in admixture with a lithium/hydrocarbon compound catalyst. In the latter case, the copolymer in general consists of a first copolymer block of conjugated diolefin with about 10 weight percent of vinyl aromatic compound and a second homopolymer block of substantially all vinyl aromatic compound. The AB type block copolymer contains the butadiene in principally the 1,4 configuration.

The ABA type block copolymers can be prepared be sequential polymerization of the monomers employing alkali metal complexes of α-methylstyrene, a catalyst and a cyclic ether; e.g., tetrahydrofuran, as solvent and reaction medium. Such block copolymers contain the butadiene in principally the 1,2 or vinyl configuration. Both types of block copolymers are operable in the invention as previously mentioned.

It is important that the AB type block copolymers have the butadiene chemically combined or polymerized in principally the 1,4 configuration and that the ABA type block copolymers contain the butadiene in principally the vinyl or 1,2 configuration. Both types of the block copolymers should contain at least 75 percent of the butadiene in the stated configuration.

It is important that the monomer or mixture of monomers be a solvent for the continuous phase polymer and that the monomer be employed in substantially greater proportion than is both the continuous and discontinuous polymer in order that the polymeric product be the continuous phase having the polymers uniformly dispersed throughout the final product. The monomer may consist of from about 65 to 85 percent by weight of the starting materials or mixture.

The stabilized emulsions are useful as coatings, or in the manufacture of coating compositions, or for making high impact styrene polymers. Examples of high impact styrene polymers are normally solid resinous thermoplastic polymers containing in chemically combined form a major proportion by weight of a monovinyl aromatic compound, a minor amount by weight of a vinylidene compound selected from the group consisting of acrylonitrile, methyl methacrylate and α-methylstyrene, and from 1 to 15 percent by weight of natural or a synthetic rubber which is a rubbery homopolymer of butadiene or a copolymer of a major proportion by weight; e.g., 50 percent by weight or more, of butadiene and a minor proportion of a monovinyl aromatic hydrocarbon such as styrene. Such styrene polymers and a method of making the same are described in U.S. Pat. No. 2,694,692.

The stabilized emulsions can be polymerized by heating the same in mass with or without agitation and at temperatures between 60° C. and 260° C. at atmospheric, superatmospheric, or subatmospheric pressures, or by heating the solution while dispersed as droplets in an inert aqueous medium; i.e., in aqueous suspension, at suitable temperatures and pressures to substantially polymerize the monomer and form a normally solid thermoplastic product.

The polymer is recovered and is heated at elevated temperatures preferably under vacuum or subatmospheric pressure to remove volatile ingredients.

The following examples illustrate ways in which the principle of the invention has been applied, but are not to be construed as limiting its scope.

EXAMPLE 1

In each of a series of experiments, a charge of 20 parts by weight of high molecular weight molding grade polystyrene, 5 parts by weight of a polymer as stated in the following table, 73.5 parts by weight of monomeric styrene and 1.5 parts by weight of a block copolymer of a kind as stated in the following table were stirred together at room temperature until the polymers were dissolved and the mixture was a uniform composition. Thereafter, the mixture was allowed to stand quiescent. It was observed from time to time to determine if layering or de-mixing occurred. Tables I and II identify the experiments, names of the polymers used in the experiments and gives the proportion in percent by weight of each of the ingredients used in preparing the dispersion. The tables also give the stability of the dispersion; i.e., the time in hours until the start of layering or de-mixing was observed.

For purposes of comparison, a solution of 5 parts by weight of polymethyl methacrylate, 75 parts of monomeric styrene and 20 parts of high molecular weight molding grade polystyrene without block copolymer (Run No. 1, Table I) de-mixed in less than 24 hours, and a solution of 5 parts of butyl rubber, 75 parts of styrene and 20 parts of polystyrene (Run No. 7, Table II) de-mixed in less than 1 hour.

TABLE I

| RUN NO. | MONOMER Kind | % | CONTINUOUS PHASE POLYMERS Kind | % | DISCONTINUOUS PHASE POLYMER Kind | % | BLOCK COPOLYMER Kind | % | REMARKS |
|---|---|---|---|---|---|---|---|---|---|
| 1 |  | 75 |  | 20 | Polymethyl methacrylate | 5 | None | — | De-mixed in less than one day |

TABLE I – Continued

| RUN NO. | MONOMER Kind | % | CONTINUOUS PHASE POLYMERS Kind | % | DISCONTINUOUS PHASE POLYMER Kind | % | BLOCK COPOLYMER Kind | % | REMARKS |
|---|---|---|---|---|---|---|---|---|---|
| 2 | | 73.5 | | 20 | Polymethyl methacrylate | 5 | ABA | 1.5 | Stable at 70 days |
| 3 | sty- | 73.5 | Poly- | 20 | Poly(t-butyl-styrene) | 5 | ABA | 1.5 | Stable at 70 days |
| 4 | rene | 73.5 | sty- | 20 | 85 styrene/ 15 acrylonitrile | 5 | ABA | 1.5 | Stable at 103 days |
| 5 | | 73.5 | rene | 20 | 1,2 Polybutadiene | 5 | ABA | 1.5 | Stable at 98 days |
| 6 | | 73.5 | | 20 | Butyl rubber | 5 | ABA | 1.5 | Stable at 60 days |
| 7 | | 73.5 | | 20 | Butyl rubber | 5 | None | — | De-mixed in less than one hour |

\* = a block copolymer of styrene/butadiene/styrene containing 30 weight percent styrene and 70 weight percent butadiene and having a molecular weight of 200,000 and 88 percent of the butadiene in the vinyl or 1,2-configuration

TABLE II

| RUN NO. | MONOMER Kind | % | CONTINUOUS PHASE POLYMERS Kind | % | DISCONTINUOUS PHASE POLYMER Kind | % | BLOCK COPOLYMER Kind | % | REMARKS |
|---|---|---|---|---|---|---|---|---|---|
| 1 | Styrene | 73.5 | Polystyrene | 20 | Polymethyl methacrylate | 5 | AB** | 1.5 | Stable at 17 days |
| 2 | Styrene | 73.5 | Polystyrene | 20 | Polyvinyl toluene | 5 | AB | 1.5 | Stable at 18 days |
| 3 | Styrene | 73.5 | Polystyrene | 20 | Poly(t-butyl-styrene) | 5 | AB | 1.5 | Stable at 16 days |
| 4 | Styrene | 73.5 | Polystyrene | 20 | 1,2 Polybutadiene | 5 | AB | 1.5 | Stable at 98 days |
| 5 | Styrene | 73.5 | Polystyrene | 20 | Butyl rubber | 5 | AB | 1.5 | Stable at 10 days |
| 6 | Styrene | 73.5 | do. | 20 | Polyisoprene | 5 | AB | 1.5 | Stable at 14 days |
| 7 | Styrene | 73.5 | do. | 20 | Polyisoprene | 5 | None | — | De-mixed in 1 day |

\*\* = a block copolymer of 60 percent styrene and 40 percent butadiene having an inherent viscosity of 1.3

EXAMPLE 2

A charge of 73.5 parts by weight of monomeric styrene, 5 parts of polyvinyltoluene, 20 parts of polystyrene and 1.5 parts of an ABA-type block copolymer of styrene/butadiene/styrene containing 30 percent by weight of styrene and 70 percent of butadiene and having a molecular weight of about 200,000 was stirred together at room temperature until uniform, then was allowed to stand quiescent. The solution was stable and showed no observable signs of de-mixing after standing for 1,680 hours. In contrast, a solution of 75 parts of styrene, 20 parts of polystyrene and 5 parts of polyvinyltoluene, de-mixed after standing for only 144 hours.

EXAMPLE 3

A solution of 73.5 parts by weight of monomeric styrene, 20 parts of polystyrene, 5 parts of a resinous copolymer of 85 percent by weight styrene and 15 percent acrylonitrile and 1.5 grams of a block copolymer of 60 percent by weight styrene and 40 percent butadiene having a molecular weight of 150,000, was found to be stable after 1,680 hours. In contrast, a similar solution without the styrene/butadiene block copolymer, de-mixed in 216 hours.

EXAMPLE 4

A charge of 69 parts by weight of monomeric styrene, 5.7 parts of polybutadiene ("Diene CF-35"), 24 parts of polystyrene and 1.3 parts of an ABA-type block copolymer of styrene/butadiene/styrene containing 30 percent by weight of styrene and 70 percent of butadiene and having a molecular weight of about 200,000 was stirred together at room temperature until uniform, then was allowed to stand quiescent. The solution was stable and showed no observable signs of de-mixing after standing for 6 months. In contrast, a similar solution but without the block copolymer de-mixed after standing for only 48 hours.

EXAMPLE 5

A solution of 73.5 parts by weight of monomeric vinyltoluene, 20 parts of polyvinyltoluene, 5 parts of polystyrene and 1.5 parts of a block copolymer of 60 percent by weight vinyltoluene and 40 percent butadiene having an inherent viscosity of about 1.3 was found to be stable after 480 hours. In contrast, a similar solution without the block copolymer de-mixed in 240 hours.

EXAMPLE 6

A solution of 73.5 parts by weight of monomeric t-butylstyrene, 20 parts of poly(t-butylstyrene), 5 parts of polystyrene and 1.5 parts of a block copolymer of 60 percent by weight t-butylstyrene and 40 percent butadiene having an inherent viscosity of 1.3, was found to be stable after 168 hours. In contrast, a similar solution without the block copolymer de-mixed in 72 hours.

EXAMPLE 7

A solution of 73.5 parts by weight of monomeric styrene, 20 parts of polystyrene, 5 parts of Vistanex L-80 and 1.5 parts of a block copolymer of 60 percent by weight styrene and 40 percent butadiene having an inherent viscosity of 63 was found to be stable after 120 hours. In contrast, a similar solution without the styrene/butadiene block copolymer de-mixed in 24 hours.

EXAMPLE 8

A solution of 73.5 parts by weight of monomeric styrene, 20 parts of polystyrene, 5 parts of Vistanex L-80 and 1.5 parts of an ABA-type block copolymer of 30 percent by weight styrene and 70 percent butadiene having a molecular weight of 200,000 was found to be stable after 120 hours.

EXAMPLE 9

A solution of 73.5 parts by weight of monomeric styrene, 20 parts of polystyrene, 5 parts of ethylene/propylene elastomer ("Nordel 1320") and 1.5 parts of a block copolymer of 60 percent by weight and 40 percent butadiene having an inherent viscosity of 1.3 was found to be stable after 80 days. In contrast, a similar solution without the block copolymer de-mixed in less than 1 hour.

EXAMPLE 10

A solution of 73.5 parts by weight of monomeric styrene, 20 parts of polystyrene, 5 parts of ethylene/propylene elastomer ("Nordel 1320") and 1.5 parts of an ABA-type block copolymer of 30 percent by weight styrene and 70 percent butadiene having a molecular weight of 200,000 was found to be stable after 48 days.

EXAMPLE 11

A solution of 73.5 parts by weight of monomeric styrene, 20 parts of polystyrene, 5 parts of poly-t-butylstyrene and 1.5 parts of a block copolymer of 50 percent by weight styrene and 50 percent t-butylstyrene having an inherent viscosity of 1.3 was found to be stable after 5 days. In contrast, a similar solution without the styrene-t-butylstyrene block copolymer, de-mixed in 24 hours.

As is apparent from the foregoing specification, the present invention is susceptible of being embodied with various alterations and modifications which may differ particularly from those that have been described in the preceding specification and description. For this reason, it is to be fully understood that all of the foregoing is intended to be merely illustrative and is not to be construed or interpreted as being restrictive or otherwise limiting of the present invention.

What is claimed is:

1. A method of making a stable emulsion of solutions of at least two different polymers in a mutual solvent comprising intimately incorporating with one another from 5 to 40 parts by weight of polymer X as the discontinuous phase per 100 parts by weight of polymer Y as the continuous phase in from 100 to 900 parts by weight of a mutual solvent and from 0.5 to 5 percent by weight based on the weight of the mixture of a soluble block copolymer of the type ABA or AB wherein A or B is identical with Y, and which block copolymer has an inherent viscosity between 1.3 and 3.7.

2. A method of making a stable emulsion of solutions of at least two different polymers in an ethylenically unsaturated monomer as mutual solvent which comprises intimately incorporating with one another from 5 to 40 parts by weight of polymer X as the discontinuous phase per 100 parts by weight of polymer Y as the continuous phase in from 100 to 900 parts by weight of monomer Y as solvent and from 0.5 to 5 percent by weight of the weight of the mixture of a soluble block copolymer of the type ABA or AB wherein A or B is identical with Y, and which block copolymer has an inherent viscosity between 1.3 and 3.7.

3. A method as claimed in claim 2 wherein the polymer X is polybutadiene and the polymer Y is polystyrene.

4. A method as claimed in claim 2 wherein the block copolymer is a copolymer of styrene and butadiene of the type AB.

5. A stable emulsion composition as claimed in claim 2 wherein the block copolymer is a copolymer of styrene and butadiene of the type ABA wherein A represents styrene and B represents butadiene principally in the 1,2- or vinyl configuration.

6. A stable emulsion composition as claimed in claim 2 wherein the polymer X is an ethylene/propylene elastomer, polymer Y is polystyrene and the block copolymer is a copolymer of styrene and butadiene.

7. A composition as claimed in claim 1 wherein the mutual solvent is toluene.

8. A method of making a stable emulsion from a solution of two different polymers in a mutual monomeric solvent, the method comprising intimately incorporating with one another in a mutual monomeric solvent from 5 to 40 parts by weight of a first resinous or rubbery thermoplastic polymer or copolymer of methylmethacrylate, monovinyl aromatic hydrocarbon, butadiene or butene per 100 parts by weight of a second polymer, the second polymer being compatible with a polymer of the monomeric solvent, a stabilizing block copolymer which is a block copolymer of a vinyl aromatic compound of the AB or ABA type containing from 20 to 30 percent vinyl aromatic compound wherein A represents the vinyl aromatic compound and B represents butadiene in from 100 to 900 parts by weight of the solvent, the block copolymer being present in a proportion of from 0.5 to 5 percent by weight, based on the mixture, with the further limitation that A or B is identical with the second polymer in the continuous phase, the inherent viscosity of the block copolymer being between 1.3 and 3.7 and the first polymer is in the discontinuous phase.

9. A method of making a stable emulsion from a solution of two different polymers in a mutual monomeric solvent, the method comprising intimately incorporating in a mutual monomeric solvent from 5 to 40 parts by weight of a first resinous or rubbery thermoplastic polymer or copolymer of methylmethacrylate, monovinyl aromatic hydrocarbon, butadiene, butene, styrene, vinyl toluene, t-butylstyrene or copolymers of from about 65 weight percent to 85 weight percent styrene and from about 35 to 15 weight percent acrylonitrile, copolymers of styrene and methylmethacrylate, polybutadiene, copolymers of styrene and butadiene, polyisoprene, ethylene/propylene copolymers and polybutene rubbers per 100 parts by weight of a second polymer which is compatible with a polymer of the monomeric solvent, a stabilizing block copolymer which is a block copolymer of a vinyl aromatic compound of the AB or ABA type containing from 20 to 30 percent vinyl aromatic compound wherein A represents the vinyl aromatic compound and B represents butadiene in from 100 to 900 parts by weight of the solvent, the block copolymer being present in a proportion of from 0.5 to 5 percent by weight, based on the mixture, with the further limitation that A or B is identical with the second polymer in the continuous phase, and the inherent viscosity of the block copolymer being between 1.3 and 3.7 and the first polymer is in the discontinuous phase.

* * * * *

PO-1050
(5/69)

UNITED STATES PATENT OFFICE
CERTIFICATE OF CORRECTION

Patent No. 3,860,551        Dated January 14, 1975

Inventor(s) Munisamappa Narayana, Henna Keskkula, Jerry E. Mason

It is certified that error appears in the above-identified patent and that said Letters Patent are hereby corrected as shown below:

Cover page of the patent which gives names of inventors and town in which the inventors live is in error. Patent states "all of Hemlock, Mich.". The first two inventors, Munisamappa Narayana and Henno Keskkula are of Midland, Michigan and Jerry E. Mason is of Hemlock, Michigan.

Column 3, line 42, the last word of line "be" should be --by--.

Column 4, Table I, which carries over to next page, Columns 5 and 6, under the second heading MONOMER Kind the word "Styrene" should appear all the way down the column. In the next heading CONTINUOUS PHASE POLYMERS Kind the word "Polystyrene" should appear all the way down the column; In the same table, under BLOCK COPOLYMER Kind for Run No. 2, an asterisk should appear after ABA so that it reads --ABA*--.

Signed and sealed this 29th day of April 1975.

(SEAL)
Attest:

RUTH C. MASON
Attesting Officer

C. MARSHALL DANN
Commissioner of Patents
and Trademarks